United States Patent [19]

Michener et al.

[11] Patent Number: 5,351,293
[45] Date of Patent: Sep. 27, 1994

[54] SYSTEM METHOD AND APPARATUS FOR AUTHENTICATING AN ENCRYPTED SIGNAL

[75] Inventors: John R. Michener; Benjamin Samit, both of Princeton, N.J.

[73] Assignee: Wave Systems Corp.

[21] Appl. No.: 11,883

[22] Filed: Feb. 1, 1993

[51] Int. Cl.$^5$ .......................... H04L 9/00; H03K 3/84
[52] U.S. Cl. ......................................... 380/21; 380/4;
380/44; 380/45; 380/46
[58] Field of Search ....................... 380/21, 23, 24, 25,
380/45, 46, 47, 44, 4

[56] References Cited

U.S. PATENT DOCUMENTS

| | | |
|---|---|---|
| 4,503,287 | 3/1985 | Morris et al. . |
| 4,578,530 | 3/1986 | Zeidler . |
| 4,601,011 | 7/1986 | Grynberg . |
| 4,710,613 | 12/1987 | Shigenaga . |
| 4,881,263 | 11/1989 | Herbison et al. . |
| 4,888,800 | 12/1989 | Marshall et al. . |
| 4,924,513 | 5/1990 | Herbison et al. . |
| 5,022,080 | 6/1991 | Durst et al. ............................ 380/23 |
| 5,109,413 | 4/1992 | Comerford et al. ..................... 380/4 |
| 5,131,039 | 7/1992 | Chaum ................................. 380/23 |
| 5,148,481 | 9/1992 | Abraham et al. ....................... 380/46 |
| 5,175,766 | 12/1992 | Hamilton . |
| 5,218,637 | 6/1993 | Angebaud et al. .................... 380/23 |
| 5,226,080 | 7/1993 | Cole et al. ............................. 380/25 |
| 5,241,599 | 8/1993 | Bellovin et al. ....................... 380/21 |

Primary Examiner—Stephen C. Buczinski

[57] ABSTRACT

A cryptographic communications system includes a method and apparatus for exchanging messages between a user terminal, containing a secret key, and an operations center wherein each party authenticates signals received from the other party before any other information is exchanged. An initial identification message from the user terminal to the operations center contains an encrypted value of current time. The operations center checks the received message against local time to verify real time concurrent operation of the user terminal. Subsequently, the operations center and the user terminal mutually exchange encrypted challenge blocks, and each provide respective encrypted responses to the encrypted challenge blocks. The challenge and response exchanges demonstrate that each knows the secret key stored in the user terminal before other information, such as downloaded credit or uploaded data usage, is exchanged. In particular, the challenge and response messages exchange a first random number generated in the user terminal and a second random number generated in the operations center, which are variables used in conjunction with the user secret key to generate a new session key for encrypting the remainder of the messages exchanging data in the communication session.

14 Claims, 8 Drawing Sheets

OPERATIONS CENTER (OPC)

REMOTE CRYPTOGRAPHIC
CONTROL UNIT

OPERATIONS CENTER
(OPC)

SYSTEM METHOD AND APPARATUS FOR AUTHENTICATING AN ENCRYPTED SIGNAL

FIELD OF THE INVENTION

The present invention relates to secure cryptographic communications systems, and particularly to a method and apparatus for authenticating an encrypted signal in a secure cryptographic communications system.

BACKGROUND OF THE INVENTION

In U.S. Pat. No. 4,827,508 to Shear, or U.S. Pat. No. 5,010,571 to Katznelson, a system for metering the access to encrypted data in a CD ROM database is disclosed. Briefly, in Shear or Katznelson, a CD ROM containing an encrypted database of interest to a user is distributed typically at nominal cost or at no cost. The user terminal includes a CD ROM reader, and a remote cryptographic control unit which is provided with stored cryptographic keys needed to access to the database. The amount of actual data use, i.e. the retrieval and decryption of data from the CD ROM, is metered locally and recorded as a stored data usage record. The charge for data access may be either in accordance with the amount of data decrypted, or in accordance with price information recorded in the respective data headers of each individual data packet.

The local stored data usage record is reported (uploaded) by telephone modem (or other telecommunications link) from tile remote user terminal to a cryptographic operations center. Each remote cryptographic control unit has a stored user secret key, unique to that user terminal. Communication between the user terminal and the cryptographic operations center is protected by encryption under the user secret key, which is stored in a secure memory in the cryptographic control unit. The user secret key for each user is also stored in the cryptographic operations center. When a remote user terminal calls in and identifies itself, the cryptographic operations center looks up the corresponding user secret cryptographic user key, which is then used to secure the subsequent communication data exchange between the remote user terminal and the cryptographic operations center. Also stored in the cryptographic operations center are the various cryptographic keys corresponding to the available CD ROM database titles. The user secret key is also used to secure the delivery of secret database keys from the cryptographic operations center to the user terminal for a desired CD ROM database.

As indicated, the remote cryptographic control unit reports data usage by telephone modem. After the data usage report is successfully uploaded to the cryptographic operations center, the user is then billed for the actual database usage based on the content of the uploaded data usage report. Thus, rather than being required to purchase an entire CD ROM database, the user pays only for the amount of data actually used or decrypted from the CD ROM.

Typically, the remote cryptographic control unit in the user terminal contains a credit register. The credit register limits the amount of data which may be decrypted before requiring a usage data report to be uploaded to the cryptographic operations center. For each data purchase recorded in the data usage record, a debit is made from the credit register. The purpose of the credit register is to prevent unlimited access to the database without reporting and paying for data usage. If the available credit is exhausted, no further data decryption is allowed until the past data usage record is reported by the user terminal to the cryptographic operations center, and a new amount of credit is then downloaded to the user terminal.

The data communication channel by telephone modem between the user terminal and the cryptographic operations center is presumed not to be secure against electronic eavesdroppers who may record and study data exchanges. Therefore, the uploaded data usage report, and the downloaded credit transaction functions are system features subject to attack by pirates to avoid payment. For example, a pirate might attempt to record and later repeat the previous transmissions of either the user terminal or the cryptographic operations center (also known as an echo attack). That is, a pirate might simulate the cryptographic operations center, i.e. act as imposter, to download fresh credit to the user terminal. In another form of attack, the pirate might simulate the output of the remote user terminal in order to transmit a false record of usage data to the cryptographic operations center. Therefore, it is critical that both the remote cryptographic control unit in the user terminal, and the cryptographic operations center, accurately authenticate messages from each other before any data usage records are uploaded and committed, or any credit authorization is downloaded, or data of any other kind is exchanged and acted upon.

SUMMARY OF THE INVENTION

The present invention is embodied in a communication system including a method and apparatus for communication between a user terminal containing a remote cryptographic control unit (CRYPTO unit) and a cryptographic operations center (OPC).

To guard against echo attacks, a first communication from the CRYPTO unit contains an encrypted value of current time. The OPC decrypts the encrypted value of current time and checks the result against the local value of current time. If the received encrypted value of current time is not within a given range of the local value of current time, the OPC disconnects the telephone modem link. Thus, echo attacks using previously recorded transmissions at an earlier value of time, will not be successful.

In another aspect of the present invention, the CRYPTO unit and the OPC exchange mutual encrypted challenge blocks and receive mutual respective encrypted responses to the encrypted challenge blocks to demonstrate that each knows the secret keys before any further information, such as downloaded credit or uploaded data. usage, is exchanged. Two random numbers, a first random number and second random number, are generated in the CRYPTO unit and OPC respectively. A first communication session key, Kcom, is derived from another random number generated in the CRYPTO unit, and the user secret key, Ks. After the encrypted challenge blocks are exchanged, a second communication session key, Kcom2, is formed from the two successful challenges, and in particular, Kcom2 is from the first and second random numbers which were successfully exchanged by the mutual encrypted challenge blocks and responses.

More specifically, the OPC begins by transmitting an encrypted OPC challenge block based on the OPC generated random number. The CRYPTO unit response to the OPC challenge includes the OPC random number decrypted from the received OPC challenge block in an exclusive OR function with current time (xxusing the same time value as the previously sent encrypted value of current time) and encrypted under the user secret key, Ks. The CRYPTO unit also transmits an encrypted challenge block of its own based on the CRYPTO unit randomly generated number.

The OPC checks the CRYPTO unit response against the same exclusive OR function of current time (xxalso using the same time value as the previously received and stored encrypted value of current time), and if not equal, disconnects the telephone modem link. If the CRYPTO unit response is valid, the OPC generates a response to the CRYPTO unit challenge block based on the CRYPTO unit random number derived from the CRYPTO unit challenge block and the user secret key, Ks. The first and second random numbers function as first and second variables which differentiate one communication session from another.

The response from the OPC is checked by the CRYPTO unit against the original CRYPTO unit random number, and if not equal, the CRYPTO unit disconnects the telephone modem link. Otherwise, the CRYPTO unit and the OPC then independently generate the second common communication key, Kcom2, based on the first and second random numbers and the user secret key, Ks, which second communication key is used for the remainder of the communication session.

Both the OPC challenge and CRYPTO challenge messages were encrypted under keys based on Ks, the CRYPTO unit secret key. Thus, both the CRYPTO unit and the OPC demonstrate to the other that each knows Ks, while protecting the value of Ks from eavesdroppers. After the challenges are successful, communication is encrypted under the second communication key, Kcom2.

The OPC and the CRYPTO unit are able to generate the common second communication key from the previous successful challenges and responses. Thus, the common second communication key is based the OPC and CRYPTO unit random numbers which were successfully exchanged in a sequence based in part on the value of current time.

Viewed differently, three tests of signal origin authenticity are exchanged: a first test message to verify that both units are operating in the same time frame, a challenge to verify that the CRYPTO unit knows its own secret key, and a challenge to verify that the OPC knows the CRYPTO unit secret key. Only if the time test and both challenges are passed, is a new (second) communication key forged from current time and the two random numbers created and exchanged during the successful mutual challenges.

Finally, it should be appreciated that in addition to the present application to metering and reporting usage of CD ROM encrypted databases, the present invention may be used to authenticate remote units and provide secure communications between any two communicating devices. For example, the present invention may be used to authenticate communications between banking terminals reporting financial transactions, and the like.

DETAILED DESCRIPTION

Figure 1:
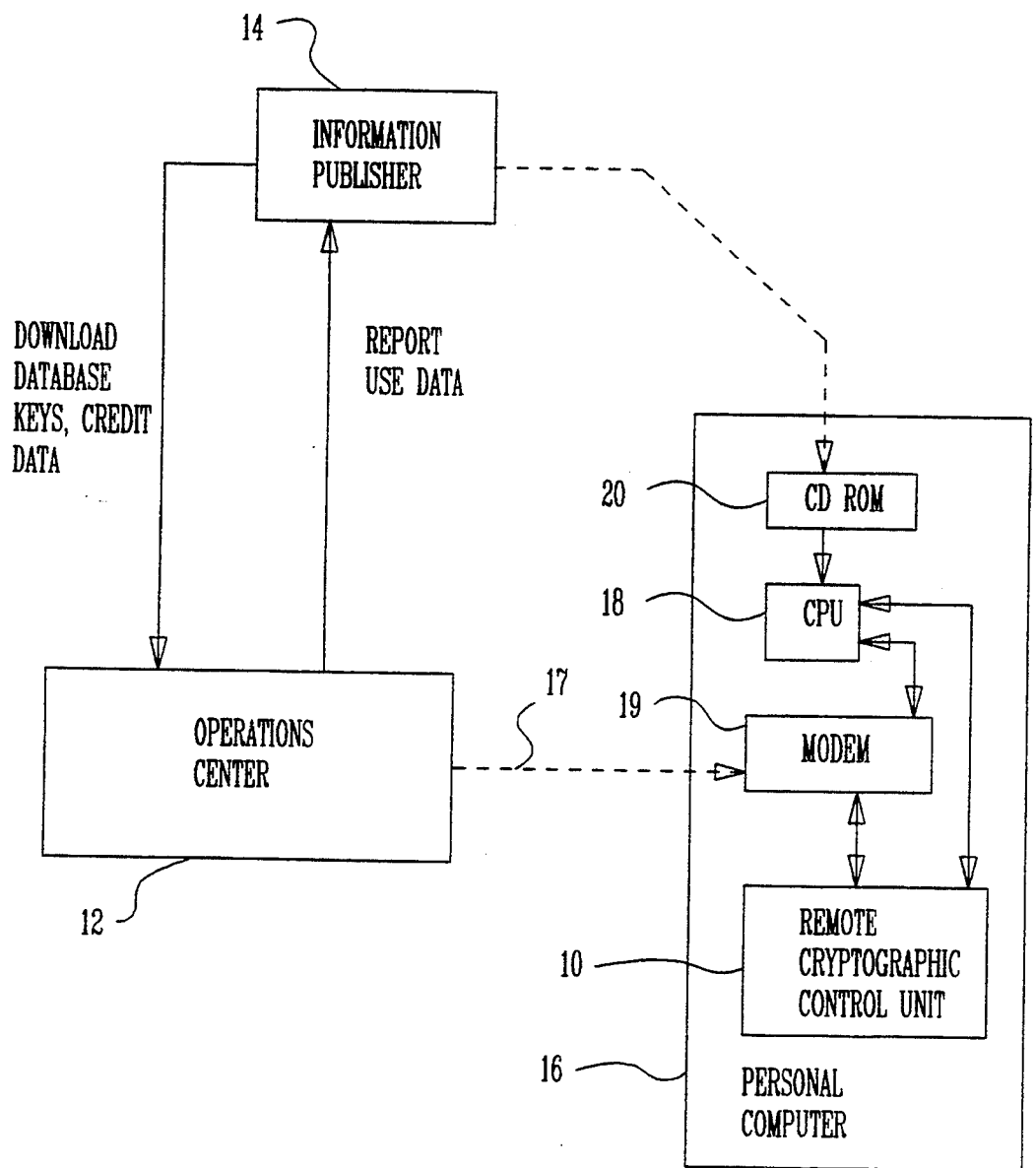
FIG. 1 is a block diagram of a system embodying the present invention for reporting metered access to an encrypted CD ROM database.

A system for metering and reporting the access to encrypted data in a CD ROM database is illustrated in block form in FIG. 1. The system includes an information publisher 14, a user terminal 16 and an OPC 12. The user terminal 16 is typically a personal computer containing CPU 18, CD ROM reader 20, modem 19, and a remote cryptographic control unit 10. The user terminal 16 is linked to the OPC 12 through a telephone line modem connection 17.

In operation, information publisher 14 provides an encrypted CD ROM to the user terminal 16. The user inserts the encrypted CD ROM into the CD ROM player 20. Using search and retrieval software in the user's personal computer, CPU 18 performs searches on the encrypted CD ROM database. In order to use the results of the search, the CPU requests that the CRYPTO unit 10 decrypt the desired data packet from the CD ROM player 20.

If the CRYPTO unit has previously been provided with the necessary database keys for the particular encrypted CD ROM, and there is sufficient credit in the internal credit register, then the CRYPTO unit 10 will decrypt the desired data packet. Thereafter, the cost of the decrypted data will be subtracted from the internal credit register. In addition, a record of the purchase and decryption of the data packet will be recorded in a stored data usage record.

At some point, in order to report data usage and replenish credit, the CRYPTO unit 10 will establish a telephone modem line connection to the OPC 12. The CRYPTO unit 10 will call the OPC if 1) the amount of available credit is exceeded, 2) the amount of available space for recording the data usage record is exceeded, 3) a fixed time period has elapsed, or 4) the user initiates a command which causes the CRYPTO unit 10 to call the OPC 12.

In any event, the CRYPTO unit 10 commands the modem 19 to establish a telephone link 17 to the OPC 12. After a telephone link is established, the CRYPTO unit 10 identifies itself to the OPC 12, which initiates a series of message exchanges to establish to the OPC 12 that the CRYPTO unit 10 is authentic. The CRYPTO unit 10 also initiates a series of message exchanges to establish to the CRYPTO unit 10 that the OPC 12 is authentic.

Following the authentication exchanges, the CRYPTO unit 10 reports its data usage record to the OPC 12. The OPC 12 uses the uploaded data usage record to inform the information publisher 14 as to the use of its published CD ROM database by the user terminal 16. Also, assuming that the user pays for data decrypted from the CD ROM, and the user is otherwise credit worthy, then the OPC 12 may download additional credit data to the CRYPTO unit 10 over the telephone link 17. The information publisher 14 also provides database keys to the OPC 12 over the telephone link 17 for any published CD ROM which may be supplied to the CRYPTO unit. The session is thereafter terminated and the CRYPTO unit 10 will have sufficient credit and database keys to continue to use and access encrypted databases in the CD ROM in player 20.

As used herein, the preferred encryption and decryption process is the Data Encryption Standard, or DES, well known to those skilled in the art. Briefly, for encryption, an input data block of 64 bits is transformed into an output data block of 64 bits in accordance with a 56 bit key. For decryption, the reverse process is carried out, also using the same 56 bit key. Therefore, the encryption key must be communicated from the information publisher to the user in order to decrypt the received communication. DES keys are typically represented in 64 bits (8 byte) quantities, with each byte having 7 bits plus 1 parity bit, or 56 key bits plus 8 parity bits.

Also, as used herein, the phrase "perform an encrypted keyload" of a variable under a secret key means to encrypt (or decrypt) that variable (usually a key) under the secret key to generate another key using the data encryption standard (DES). Encryption may be performed under a single key, or under multiple keys, such as triple keyset, for example. For triple encryption, a keyset of three keys are used to encrypt a variable using DES as follows: encrypting with key 1, decrypting with key 2, and encrypting with key 3. Triple key decryption is the reverse—decrypting with key 3, encrypting with key 2, and then decrypting with key 1.

Figure 2:
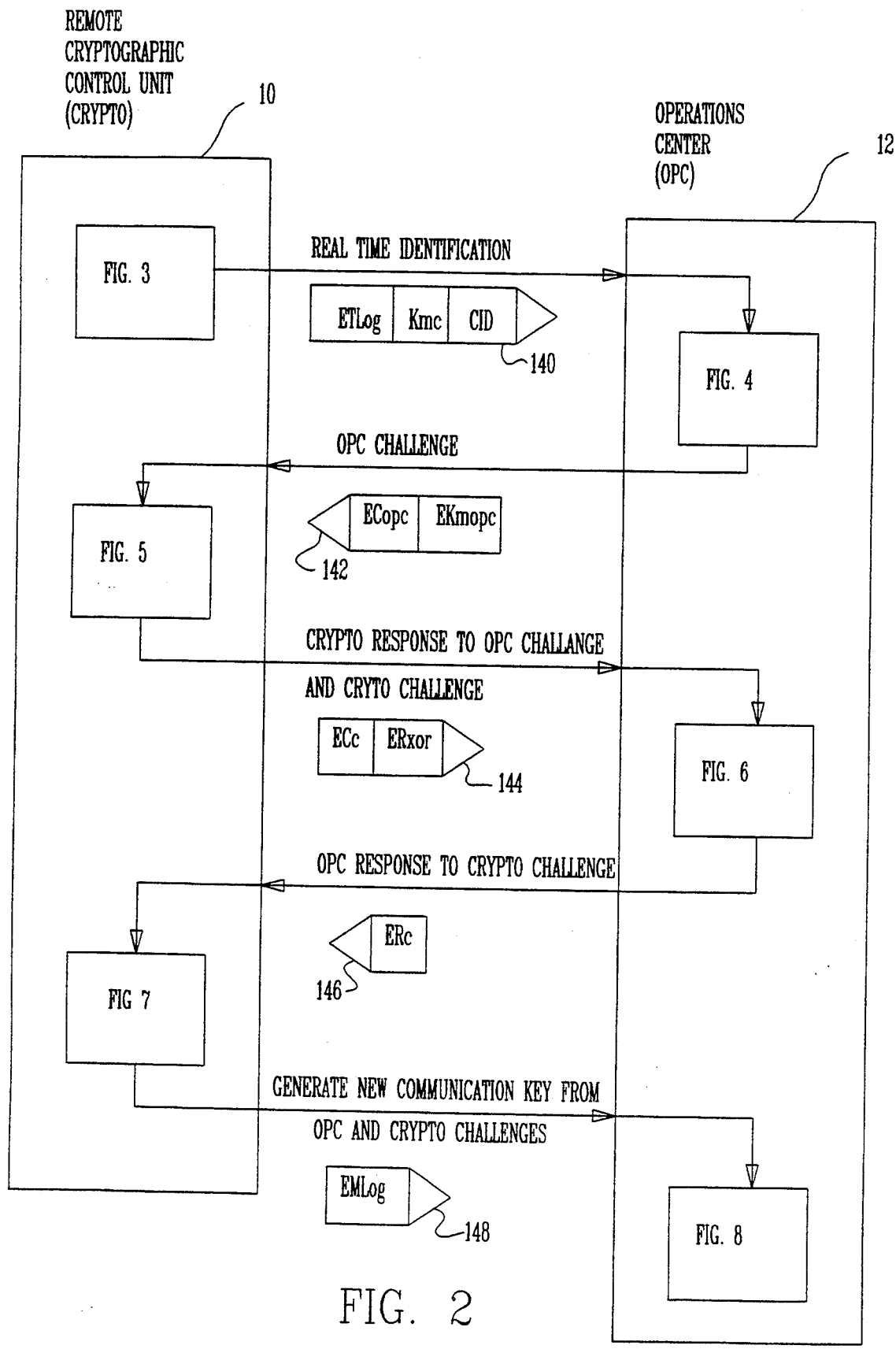
FIG. 2 is a block diagram illustrating the communication protocol between a remote cryptographic control unit and an operation center for authenticating an encrypted signal in accordance with the present invention.

FIG. 2 illustrates the data exchange protocol between the OPC and the CRYPTO unit. First, a real time identification message 140, encrypted under Kcom, is transmitted from the CRYPTO unit 10 to the OPC 12. The real time identification message 140 consists of a remote cryptographic unit identification (CID), a randomly generated key, Kmc, and ETlog, an encrypted version of current time. The OPC 12 receives the real time identification message 140 to verify that the CRYPTO unit 10 is operating in real time. In response, the OPC 12 generates and OPC challenge message 142 comprising two randomly generated numbers, Copc and Kmopc, encrypted under a session communications key, Kcom, to form ECopc and EKmopc.

The CRYPTO unit 10 receives the OPC challenge message 142 and forms a response, Rxor, based in part on the value of current time, and encrypt Rxor under Kcom to form ERxor. In addition, the CRYPTO unit 10 forms a challenge of its own, essentially a random number, Cc encrypted under Kcom to form ECc. The CRYPTO unit 10 transmits the CRYPTO response to the OPC challenge and the CRYPTO challenge in message 144, encrypted under the Kcom to the OPC 12.

The OPC 12 checks the CRYPTO response to the OPC challenge to determine whether or not the CRYPTO unit 10 is authentic. Essentially, the OPC challenge block and the CRYPTO unit response to the OPC challenge block proves to the OPC 12 that the CRYPTO unit 10 knows its own secret key. The OPC 12 also responds to the CRYPTO challenge by providing an OPC response, Rc. The OPC response, Rc, is encrypted under the Kcom to form ERc, the OPC response to CRYPTO challenge, message 146.

The CRYPTO unit 10 checks the OPC response to the CRYPTO unit challenge to determine whether the OPC 12 is authentic. Essentially, the CRYPTO unit challenge block and the OPC response to the CRYPTO unit challenge block proves to the CRYPTO unit that the OPC 12 knows the CRYPTO unit secret key.

At this point, two challenge messages and two challenge responses have been exchanged between the CRYPTO unit 10 and the OPC 12. The CRYPTO unit 10, then generates a new communication session key, Kcom2, from the OPC and the CRYPTO unit challenges. The new communication session key is used to encrypt CRYPTO unit status data, Mlog, to form a message 148 from the CRYPTO unit 10 to the OPC 12. The OPC 12 also forms the new communication key, Kcom2, from the OPC and CRYPTO unit challenges to decrypt message 148 and thereby receive the CRYPTO unit status data Mlog. Having authenticated each unit to the other, a protected encrypted exchange containing the data usage record and the downloaded credit data will follow.

Figure 3:
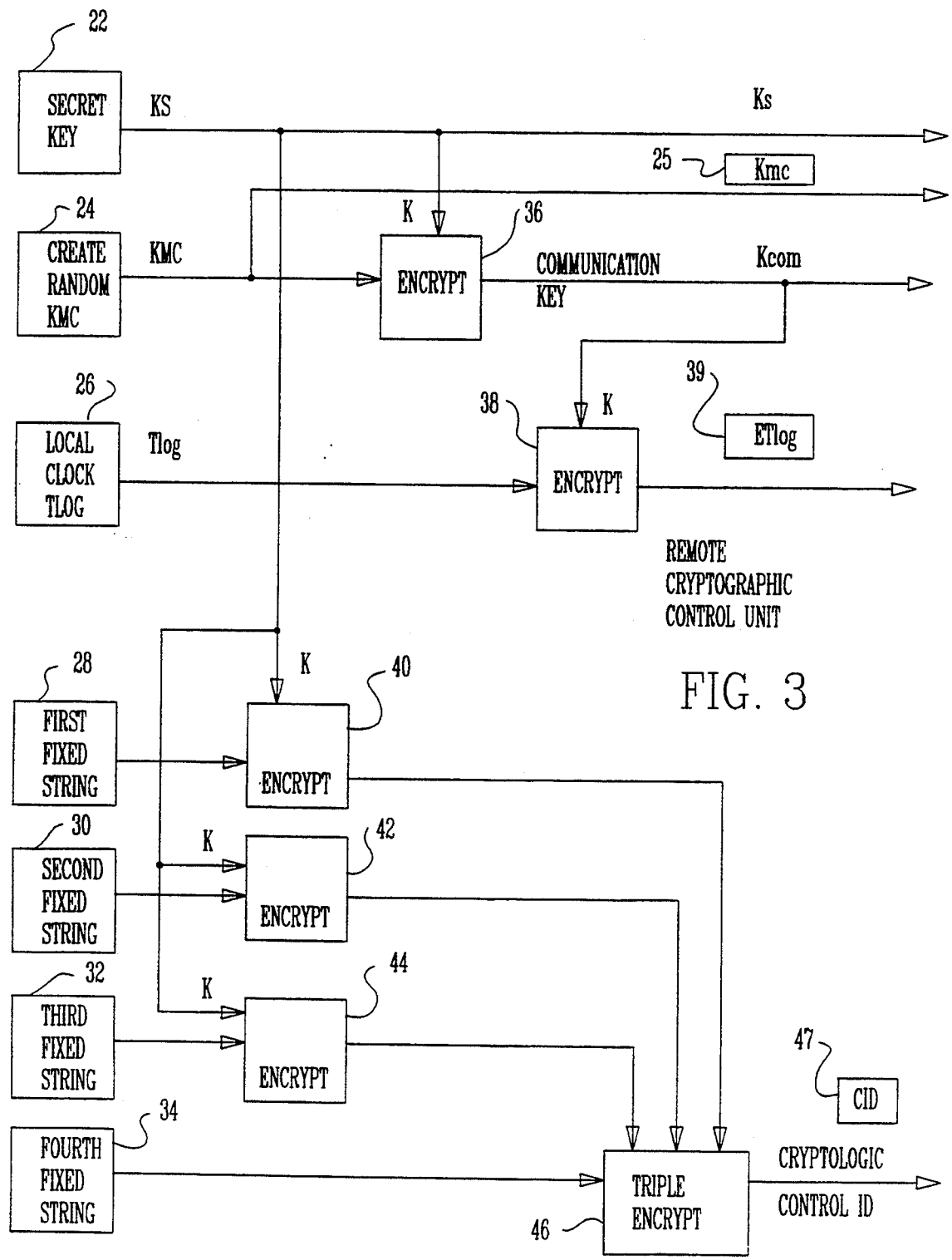
FIG. 3 is a flow chart diagram illustrating a method for generating a real time identification message in a remote cryptographic control unit in accordance with the present invention.

FIGS. 3 through 8 illustrate the foregoing message protocol in greater detail. In particular, FIG. 3 illustrates the generation of the real time identification message in the CRYPTO unit 10. The user secret key, Ks, is stored in a battery backed volatile RAM memory 22. The user secret key, Ks, is unique to a particular CRYPTO unit and thus different for each individual user.

The remote cryptographic unit identification, CID, is derived from four fixed strings 28, 30, 32 and 34 respectively stored in the CRYPTO unit 10. The user secret key Ks is used to encrypt the first fixed string 28 in encryptor 40. The user secret key Ks is also used to encrypt the second fixed string 30 in encryptor 42, and again to encrypt the third fixed string 32 in encryptor 44. The three key outputs of encryptors 40, 42, and 44 is a working keyset used to triple encrypt the fourth fixed string 34 in encryptor 46. The output of encryptor 46 is the CRYPTO unit identification number, CID. Although separate encryptors and decrypted are illustrated, it will be understood that a single DES engine may be shared for all cryptographic operations.

In order to initiate a communication session, a random key, Kmc, is created at step 24, and encrypted under Ks in encryptor 36 to form the session communication key, Kcom. In addition, the CRYPTO unit contains a local time clock 26 to provide a local time record, Tlog. The local time record, Tlog, is encrypted under Kcom in encryptor 38 to form an encrypted local time record, ETlog. The CRYPTO unit then combines serialized versions of CID, 47 Kmc 25 and ETlog 39 into a serial message to form the real time identification message 140 as shown in FIG. 2.

Thus, as indicated in FIG. 3, the CRYPTO unit performs the following functions:
1. Create CRYPTO unit ID 47 by encrypted keyloads 40, 42, 44 of three text strings 28, 30, 32 respectively, umber the CRYPTO unit secret keyset 22 to generate a working keyset. A fourth fixed string 34 is then triple key enciphered 46 under the working keyset to yield the CRYPTO unit ID, CID 47.
2. Create a random message key, Kmc, at step 24.
3. Transform Kmc into a communication working keyset, Kcom, by encrypted keyload 36 of Kmc under Ks.
4. Get time value from local clock 26, Tlog. Encrypt 38 Tlog under Kcom.
5. Transmit CID 47, message key 25 and encrypted time 39 to the OPC.

Figure 4:
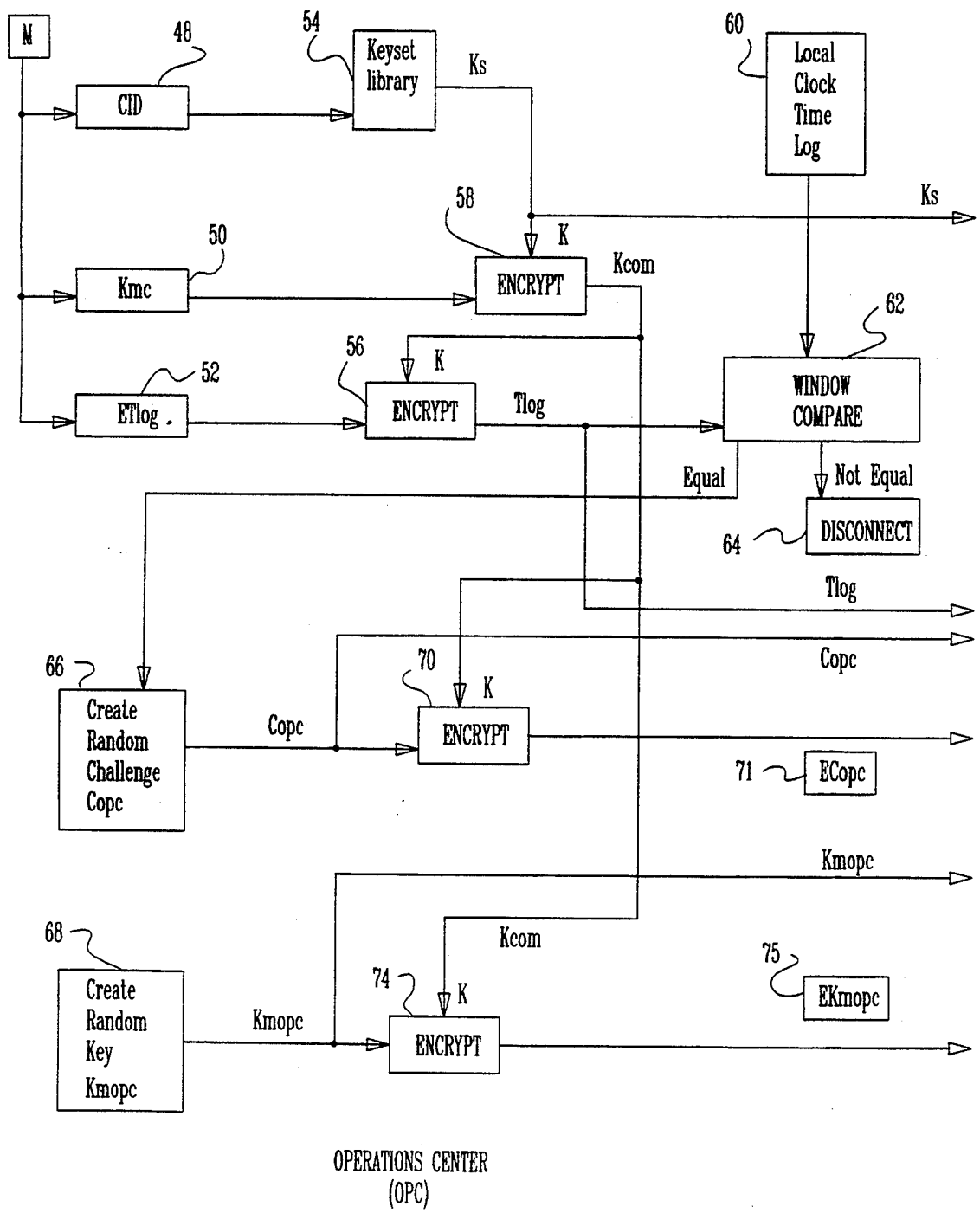
FIG. 4 is a flow chart diagram illustrating a method for verifying a real time identification message, and for generating a first cryptographic challenge in an operations center in accordance with the present invention.

FIG. 4 shows the receipt and processing of the real time identification message 140. In particular, the message is received on telephone modem link M. The received CID is stored in a register at step 48, Kms is stored in a register at step 50, and ETlog is stored in a register at step 52. The user secret key, Ks, corresponding to the received CID is retrieved from keyset library 54.

Keyset library 54 contains the secret keys for all of the users of the system. The user secret key Ks is used to encrypt the received value of Kms in encryptor 58 to form Kcom. In turn, Kcom is used to decrypt the received value of ETlog in decryptor 56 to recover the CRYPTO unit local time record, Tlog. An OPC local time clock 60 generates a local current time record which is compared to the received time record Tlog in window comparator 62. If the received time record Tlog is not within a given range of the OPC clock time log, the two time records are not equal, and the telephone connection between the OPC and the CRYPTO unit is disconnected at step 64. Tlog is retained for further use by the OPC during the communication session.

However, if the received time record is within range of the local clock time record, then the OPC creates a random challenge number, Copc, at step 66 and a random challenge key, Kmopc, at step 68. Copc is encrypted under Kcom in encryptor 70 to form ECopc. Kmopc is encrypted under the Kcom in encryptor 74 to form EKmopc. The serialized versions of ECopc 71 and EKmopc 75 form the OPC challenge message 142 as shown in FIG. 2.

Thus, as shown in FIG. 4, the OPC performs the following functions:
1. Receive initiation message 140 from the CRYPTO unit on telephone modem link M. Load supplied values 48, 50, 52, contact key server (keyset library) 54 and obtain Ks for CRYPTO unit CID.
2. Create Kcom using Kmc and the retrieved value of Ks, 58.
3. Decrypt ETlog 56. Compare 62 Tlog with local value of absolute time 60. If outside of error bounds, log error and disconnect 64.
4. Create random challenge block Copc 66, and random message key Kmopc 68.
5. Encrypt 70 Copc and 74 Kmopc under Kcom and transmit 71, 75 to CRYPTO unit.

Figure 5:
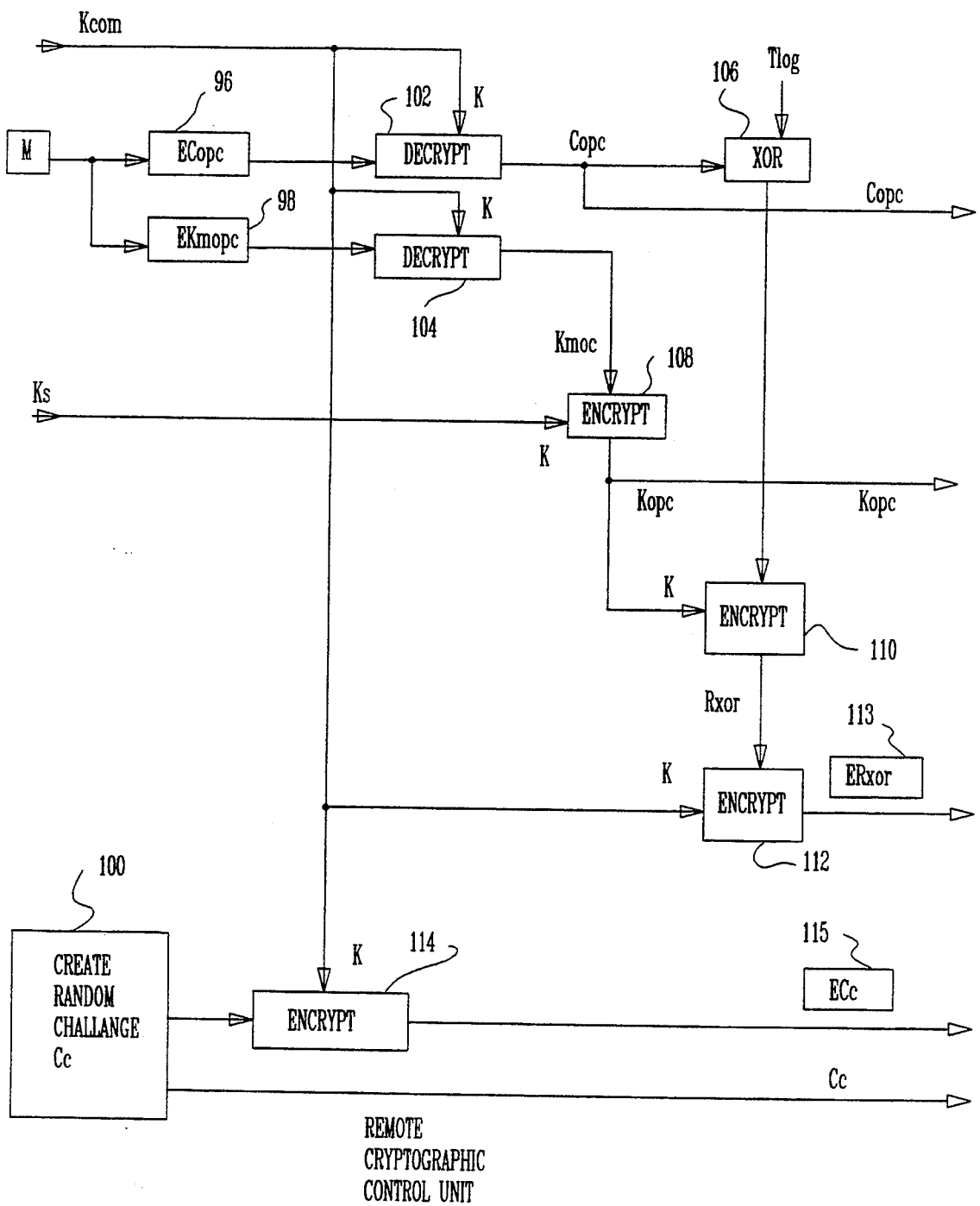
FIG. 5 is a flow chart diagram illustrating a method for generating a first cryptographic challenge response, and for generating a second cryptographic challenge in a remote cryptographic control unit in accordance with the present invention.

In FIG. 5, the OPC challenge message 142 is received on the telephone modem link M. ECopc is received and stored in a register at step 96, while EKmopc is received and stored in a register at step 98. The CRYPTO unit then decrypts the received value of ECopc under Kcom in decryptor 102 to form Copc. Also, the received value of EKmopc is decrypted under Kcom in decryptor 104 to form Kmopc, which is in turn encrypted under Ks in encryptor 108 to for Kopc. The previously received and stored value of Tlog is combined in a exclusive OR gate 106 with Copc to form Cxor. Cxor is encrypted under Kopc in encryptor 110 to form Rxor. The response to the OPC challenge is formed at the output of encryptor 112 in which Rxor is encrypted under Kcom. Also, a random challenge number Cc is formed at step 100 and encrypted under Kcom in encryptor 114 to form ECc. The serialized values of ERxor 113 and ECc 115 form the CRYPTO unit response to the OPC challenge and the CRYPTO unit challenge message 144 in FIG. 2.

Thus, in accordance with FIG. 5 the CRYPTO unit performs the following functions:
1. Receive OPC challenge message from OPC on telephone modem link M. Load received values 96, 98.
2. Decrypt ECopc 102 and EKmopc 104 using Kcom.
3. Exclusive OR Tlog (concatenated to itself to make an 8 byte quantity) with Copc 106, giving Cxor.
4. Transform Kmopc into Kopc by encrypted keyloads 108 under Ks.
5. Encrypt Cxor 110 under Kopc to create the challenge response Rxor.
6. Create 100 random challenge block Cc.
7. Encrypt Rxor 112 and Cc 114 under Kcom and transmit 113, 115 to the OPC.

Figure 6:
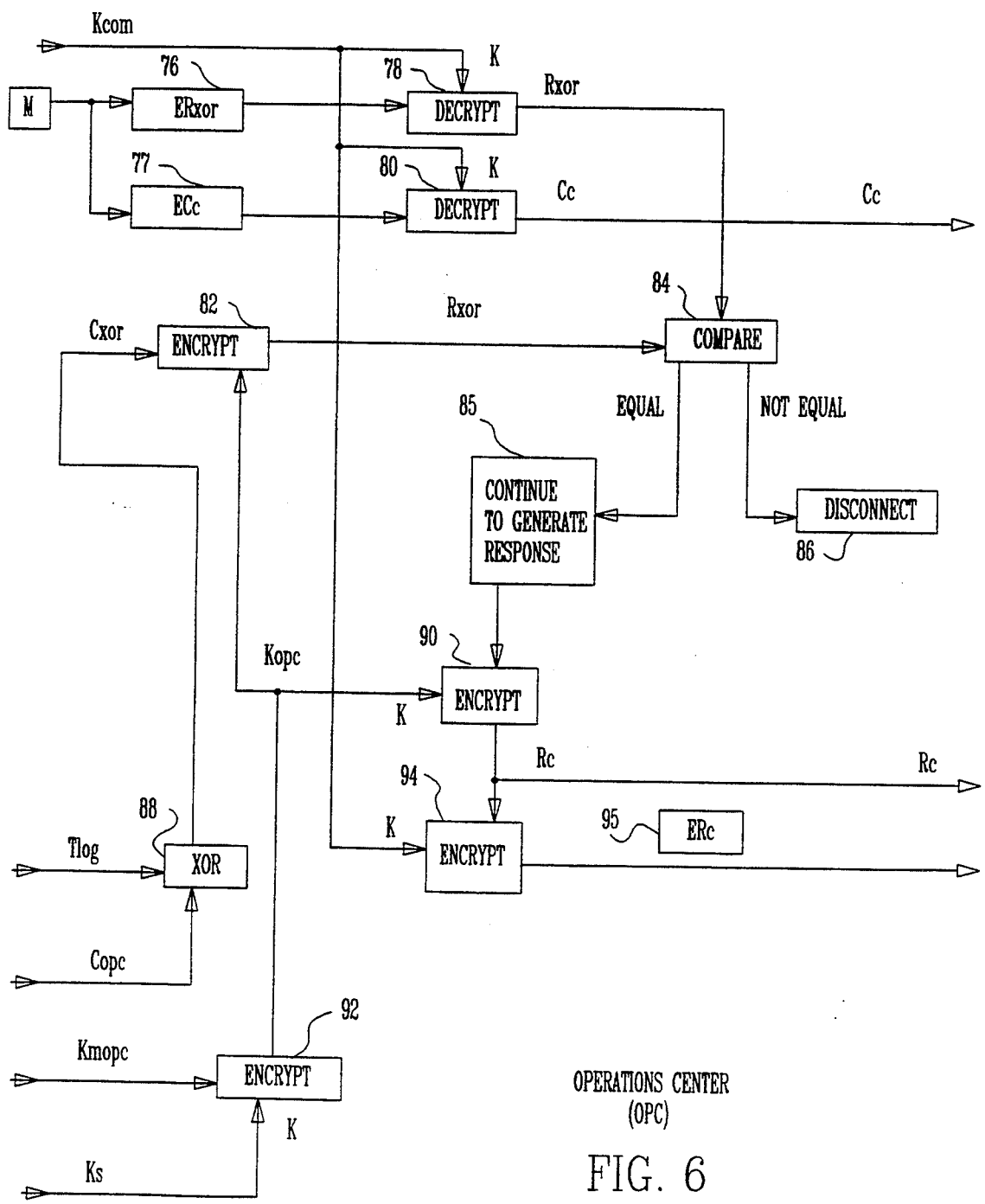
FIG. 6 is a flow chart diagram illustrating a method for verifying a first cryptographic challenge response, and for generating a second cryptographic challenge response in an operation center in accordance with the present invention.

The CRYPTO unit response to the OPC challenge and the CRYPTO unit challenge is received at the OPC on telephone modem link M in FIG. 6. Erxor is stored in a register at step 76, and ECc is stored in a register at step 77. ERxor is decrypted in decryptor 78 under Kcom to provide Rxor.

Rxor is also locally generated in the OPC. Towards this end, the exclusive OR gate function 88 of Copc and Tlog provides output Cxor. Tlog is the original time log of current time received from the CRYPTO unit which initiated the current communication session and stored in the OPC. Cxor is encrypted into encryptor 82 under Kopc. Kopc is generated in encryptor 92 by encrypting Kmopc under Ks as the encryption key. The output of encryptor 82 is the locally generated version of Rxor which is compared to the received version of Rxor in comparator 84. If Rxor as received is not equal to Rxor as locally generated, then the telephone modem link is disconnected at step 86. However, if the received and locally generated Rxor are equal, the OPC continues to generate a response at step 85.

To generate an OPC response to the CRYPTO challenge, Cc is encrypted in encryptor 90 under Kopc as the encryption key. The output of encryptor 90, Rc, is encrypted in encryptor 94 under Kcom as the encryption key to provide an encrypted response, ERc. A serial version 95 of ERc forms the OPC response to the CRYPTO challenge in message 46 of FIG. 2 which is transmitted from the OPC to the CRYPTO unit.

Thus, the OPC carries out the following process steps:
1. Receive the CRYPTO response to the OPC challenge 76 and the CRYPTO challenge 77.
2. Decrypt Rxor 78 and Cc 80 using Kcom.
3. Exclusive OR Tlog (concatenated onto itself to make and 8 byte value) onto Copc giving Cxor.

4. Transform Kmopc to Kopc by encrypted keyloads 92 under Ks.
5. Encrypt Cxor 82 under Kopc and compare 84 with Rxor. If not equal, log error and disconnect 86.
6. Encrypt Cc 90 under Kopc to create a response block, Rc.
7. Encrypt Rc 94 under Kcom and transmit to the CRYPTO unit as message 146 in FIG. 2.

Figure 7:
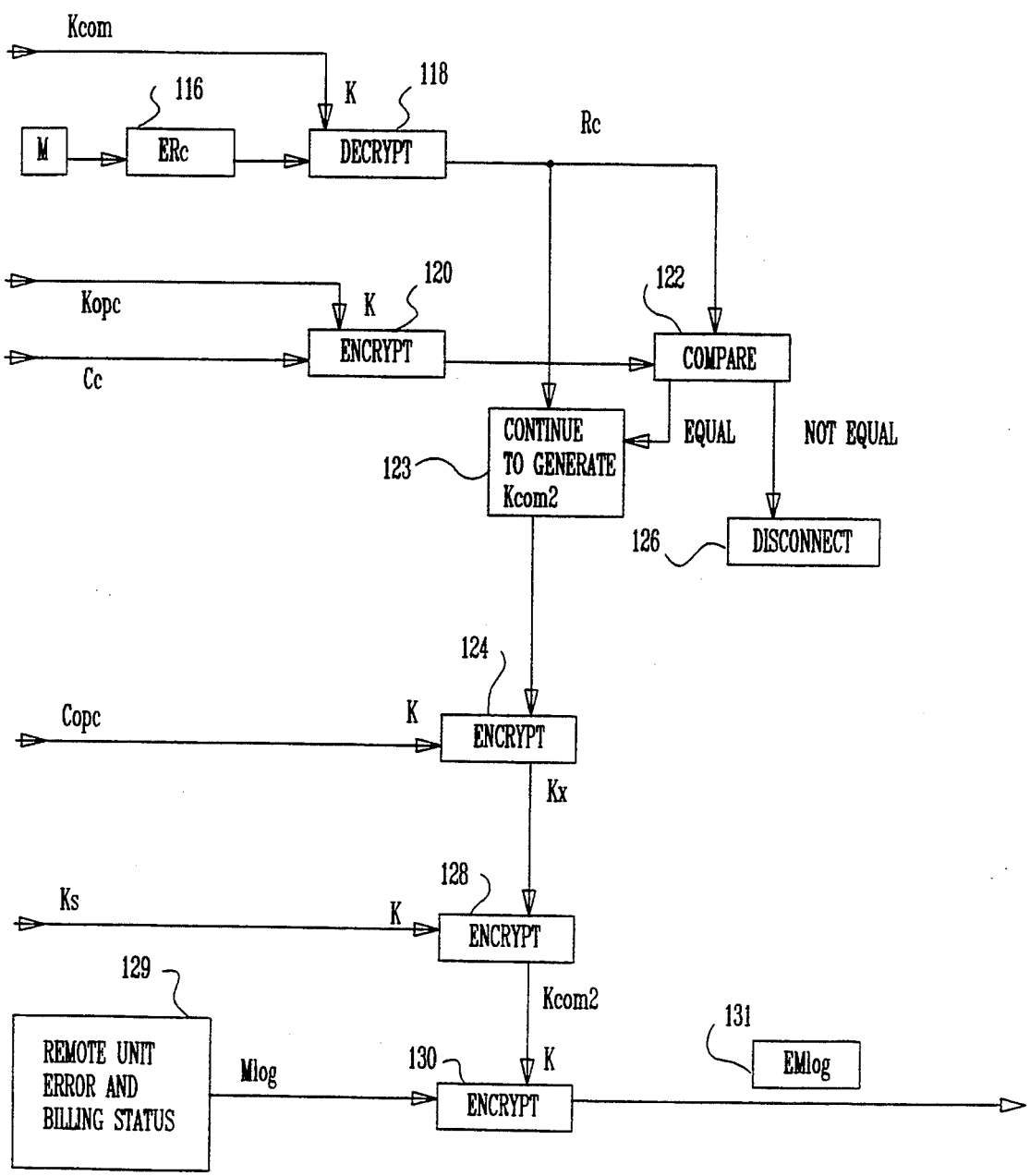
FIG. 7 is a flow chart diagram illustrating a method for verifying a second cryptographic challenge response, and for generating a second communication key in a remote cryptographic control unit in accordance with the present invention.

The CRYPTO unit receives message 146 on telephone modem terminal M in FIG. 7. The received ERc is stored in a register at step 116. ERc is decrypted in decryptor 118 under Kcom to provide the recovered CRYPTO unit challenge Rc. Rc is compared in comparator 122 with the encrypted value of Cc under Kopc at the output of encryptor 120. If the received and expected values of Rc are not equal, the CRYPTO unit disconnects the telephone modem link at step 126.

If the received value of Rc is equal to the expected value of Rc, then the communication session continues to generate a second communication session key Kcom2 at step 123. To generate Kcom2, the received Rc is encrypted under Copc in encryptor 124 to produce Kx, which is in turn encrypted under Ks in encryptor 128 to produce Kcom2.

The communication session in which billing and credit data will be exchanged begins by encrypting Mlog, the stored error and billing status 129 under Kcom2 in encryptor 130. The output of encryptor 130 is EMlog which is arranged in serial form 131 and transmitted to the OPC as message 148 in FIG. 2.

Thus, the CRYPTO unit performs the following process steps:
1. Receive the OPC response to the CRYPTO unit challenge, ERc.
2. Decrypt ERc 118 using Kcom.
3. Encrypt Cc 120 under Kopc and compare 122 to Rc. If compare fails, disconnect 126.
4. Encrypt Rc 124 using Copc as the key, creating a composite key, Kx.
5. Transform Kx 128 to Kcom2 using Ks.
6. Create 129 a status vector describing the CRYPTO unit error status and the billing register disposition Mlog.
7. Encrypt Mlog 130 under Kcom2 and transmit 131 to OPC.

Figure 8:
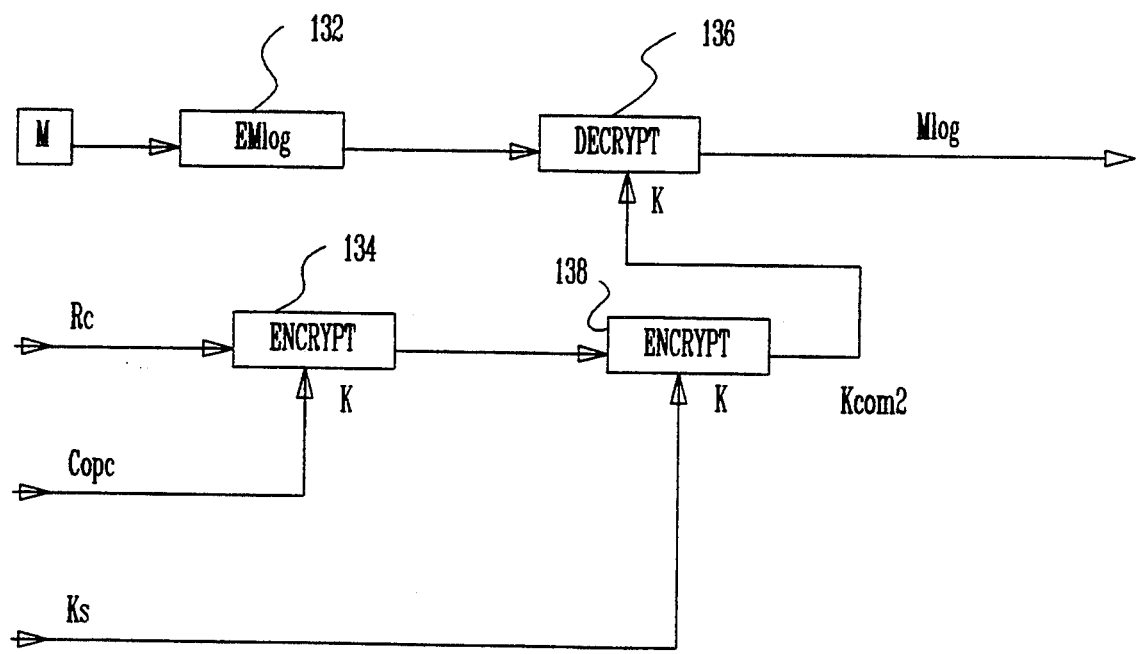
FIG. 8 is a flow chart diagram illustrating a method for generating a second communication key in an operation center in accordance with the present invention.

The encrypted status message EMlog is received at the OPC on telephone modem link terminal M and stored in a register at step 132 in FIG. 8. The new communication key Kcom2 is independently created at the OPC by encrypting Rc under Copc in encryptor 134. The output of encryptor 134 is encrypted under Ks in encryptor 138 to provide the second communication key Kcom2. The received EMlog is then decrypted in decryptor 136 under Kcom2 to produce Mlog, the billing status of the CRYPTO unit.

Therefore, the OPC performs the following step:
1. Receive EMlog 132 from the CRYPTO unit on the telephone modem link.
2. Encrypt Rc 134 using Copc as the key to create Kx.
3. Transform Kx 138 to Kcom2 using Ks.
4. Decrypt Mlog 136 using Kcom2, and proceed to direct the CRYPTO unit as a slave device.

Therefore, first the OPC and the CRYPTO unit authenticate messages from each other. Then, other data, such as billing data or credit data is exchanged.

What is claimed is:

1. In a cryptographic communication system including first and second terminals, said first and second terminals being connected via a telecommunications link, a method for authenticating encrypted signals between said first and second terminals, wherein said first terminal stores a user secret key and wherein said second terminal includes a keyset library memory for storing said user secret key, said method comprising:

sending a first cryptographic challenge block including a first variable, from said second terminal to said first terminal;

receiving said first cryptographic challenge block at said first terminal;

responding to said first cryptographic challenge block by sending from said first terminal a first cryptographic challenge block response based on said first variable received in said first cryptographic challenge block and said user secret key stored in said first terminal;

receiving said first cryptographic challenge block response at said second terminal;

computing at said second terminal an expected first cryptographic challenge block response;

comparing said received first cryptographic challenge block response to said expected first cryptographic challenge block response in said second terminal; and disconnecting said telecommunications link between said first and second terminals if said received first cryptographic challenge block response is not substantially equal to said expected first cryptographic challenge block response;

whereby said first terminal authenticates to said second terminal responsive to said cryptographic challenge block that said first terminal stores the same secret key as said second terminal;

sending a second cryptographic challenge block including a second variable, from said first terminal to said second terminal;

receiving said second cryptographic challenge block including said second variable, at said second terminal;

responding to said second cryptographic challenge block by sending from said second terminal a second cryptographic challenge block response based on said first variable in said first cryptographic challenge block, said received second variable in said second cryptographic challenge block and said user secret key stored in said keyset library of said second terminal;

receiving said second cryptographic challenge block response at said first terminal;

computing at said first terminal an expected second cryptographic challenge block response using said first variable received in said first cryptographic challenge block, said second variable in said second cryptographic challenge block and said user secret key stored in said first terminal;

comparing said received second cryptographic challenge block response to said expected second cryptographic challenge block response in said first terminal; and disconnecting said telecommunications link between said second and first terminals if said received second cryptographic challenge block response is not substantially equal to said expected second cryptographic challenge block response;

whereby said second terminal authenticates to said first terminal responsive to said second cryptographic challenge block that said second terminal stores the same user secret key as said first terminal.

2. A method in accordance with claim 1, wherein said step of responding to said first cryptographic challenge block by sending from said first terminal a first cryptographic challenge block response based on said first variable received in said first cryptographic challenge block and said user secret key stored in said first terminal, further comprises:
- decrypting said received first cryptographic challenge block to obtain said first variable;
- generating a current time record;
- computing the exclusive OR function of said current time record and said first variable; and
- encrypting said exclusive OR function of said current time record and said first variable under a key derived from said user secret key stored in said first terminal.

3. A method in accordance with claim 2, wherein said step of responding to said second cryptographic challenge block by sending from said second terminal a second cryptographic challenge block response based on said first variable from said first cryptographic challenge block, said second variable received in said second cryptographic challenge block and said user secret key stored in said second terminal;
- decrypting said received second cryptographic challenge block to obtain said second variable;
- encrypting said second variable under a key derived from said first variable, and under a key derived from said user secret key stored in said second terminal.

4. In a cryptographic communication system including first and second terminals, said first and second terminals being connected via a telecommunications link, an apparatus for authenticating encrypted signals between said first and second terminals, wherein said first terminal stores a user secret key and wherein said second terminal includes a keyset library memory for storing said user secret key, said method comprising:
- means for sending a first cryptographic challenge block including a first variable, from said second terminal to said first terminal;
- means for receiving said first cryptographic challenge block at said first terminal;
- means for responding to said first cryptographic challenge block by sending from said first terminal a first cryptographic challenge block response based on said first variable received in said first cryptographic challenge block and said user secret key stored in said first terminal:
- means for receiving said first cryptographic challenge block response at said second terminal;
- means for computing at said second terminal an expected first cryptographic challenge block response;
- means for comparing said received first cryptographic challenge block response to said expected first cryptographic challenge block response in said second terminal; and
- means for disconnecting said telecommunications link between said first and second terminals if said received first cryptographic challenge block response is not substantially equal to said expected first cryptographic challenge block response;

whereby said first terminal authenticates to said second terminal responsive to said cryptographic challenge block that said first terminal stores the same secret key as said second terminal;
- means for sending a second cryptographic challenge block including a second variable, from said first terminal to said second terminal;
- means for receiving said second cryptographic challenge block including said second variable, at said second terminal;
- means for responding to said second cryptographic challenge block by sending from said second terminal a second cryptographic challenge block response based on said first variable in said first cryptographic challenge block, said received second variable in said second cryptographic challenge block and said user secret key stored in said keyset library of said second terminal;
- means for receiving said second cryptographic challenge block response at said first terminal;
- means for computing at said first terminal an expected second cryptographic challenge block response using said first variable received in said first cryptographic challenge block, said second variable in said second cryptographic challenge block and said user secret key stored in said first terminal;
- means for comparing said received second cryptographic challenge block response to said expected second cryptographic challenge block response in said first terminal; and
- means for disconnecting said telecommunications link between said second and first terminals if said received second cryptographic challenge block response is not substantially equal to said expected second cryptographic challenge block response;

whereby said second terminal authenticates to said first terminal responsive to said second cryptographic challenge block that said second terminal stores the same user secret key as said first terminal.

5. An apparatus in accordance with claim 4, wherein said means for responding to said first cryptographic challenge block by sending from said first terminal a first cryptographic challenge block response based on said first variable received in said first cryptographic challenge block and said user secret key stored in said first terminal, further comprises:
- means for decrypting said received first cryptographic challenge block to obtain said first variable;
- means for generating a current time record;
- means for computing the exclusive OR function of said current time record and said first variable; and
- means for encrypting said exclusive OR function of said current time record and said first variable under a key derived from said user secret key stored in said first terminal.

6. An apparatus in accordance with claim 5, wherein said means for responding to said second cryptographic challenge block by sending from said second terminal a second cryptographic challenge block response based on said first variable from said first cryptographic challenge block, said second variable received in said second cryptographic challenge block and said user secret key stored in said second terminal;
- means for decrypting said received second cryptographic challenge block to obtain said second variable;

means for encrypting said second variable under a key derived from said first variable, and under a key derived from said user secret key stored in said second terminal.

7. In a secure cryptographic communication system including first and second terminals, said first and second terminals being connected via a telecommunications link, a method for providing encrypted signals between said first and second terminals using a first communication session key and a second communication session key, wherein said first and second terminal each store a user secret key for generating said first communication session key common to said first and second terminals, said first communication session key being used for authenticating an encrypted signal in said secure cryptographic communications system, said second communication key being used as an encryption key for secure communications between said first and second terminals, said method comprising:

generating a first variable at said first terminal;

generating a second variable at said second terminal;

exchanging said first and second variables between said first and second terminals using said first communication session key;

forming said second communication session key at each said first and second terminals from said first and second variables; and using said second communication session key as an encryption key for secure communications between said first and second terminals.

8. A method in accordance with claim 7, wherein said steps of generating said first variable and said second variable comprise generating a first random number and generating a second random number, respectively.

9. A method in accordance with claim 7, wherein said step of exchanging said first and second variables using said first communication session key further comprises:

sending a first cryptographic challenge block from said first terminal to said second terminal by encrypting said first variable using said first communication session key;

receiving said first cryptographic challenge block at said second terminal by decrypting said first variable using said first communication session key;

sending a second cryptographic challenge block from said second terminal to said first terminal by encrypting said second variable using said first communication session key; and receiving said second cryptographic challenge block at said first terminal by decrypting said second variable using said first communication session key, whereby said first and second terminals exchange said first and second variables.

10. A method in accordance with claim 9, further including:

generating at said first terminal a time record indication of current time;

sending from said first terminal, an encrypted time identification message containing said indication of current time to said second terminal;

responding to said first cryptographic challenge block by sending from said first terminal a first cryptographic challenge block response based on said first variable received in said first cryptographic challenge block and said indication of current time; and selecting said second communication session key at said first terminal based on said generated indication of current time, selecting said second communication session key at said second terminal based on said received indication of current time, whereby said second communication key is based said first and second variables which were exchanged between said first and second terminals in a message derived from the value of current time.

11. In a secure cryptographic communication system including first and second terminals, said first and second terminals being connected via a telecommunications link, an apparatus for providing encrypted signals between said first and second terminals using a first communication session key and a second communication session key, wherein said first and second terminal each store a user secret key for generating said first communication session key common to said first and second terminals, said first communication session key being used for authenticating an encrypted signal in said secure cryptographic communications system, said second communication key being used as an encryption key for secure communications between said first and second terminals said apparatus comprising:

means for generating a first variable at said first terminal;

means for generating a second variable at said second terminal;

means for exchanging said first and second variables between said first and second terminals using said first communication session key;

means for forming said second communication session key at each said first and second terminals from said first and second variables; and means for using said second communication session key as an encryption key for secure communications between said first and second terminals.

12. An apparatus in accordance with claim 11, wherein said means for generating said first variable and said second variable comprise means for generating a first random number and means for generating a second random number, respectively.

13. An apparatus in accordance with claim 11, wherein said step of exchanging said first and second variables using said first communication session key further comprises:

means for sending a first cryptographic challenge block from said first terminal to said second terminal by encrypting said first variable using said first communication session key;

means for receiving said first cryptographic challenge block at said second terminal by decrypting said first variable using said first communication session key;

means for sending a second cryptographic challenge block from said second terminal to said first terminal by encrypting said second variable using said first communication session key; and means for receiving said second cryptographic challenge block at said first terminal by decrypting said second variable using said first communication session key, whereby said first and second terminals exchange said first and second variables.

14. An apparatus in accordance with claim 13, further including:

means for generating at said first terminal a time record indication of current time;

means for sending from said first terminal, an encrypted time identification message containing said indication of current time to said second terminal;

means for responding to said first cryptographic challenge block by sending from said first terminal a first cryptographic challenge block response based on said first variable received in said first cryptographic challenge block and said indication of current time; and means for selecting said second communication session key at said first terminal based on said generated indication of current time, means for selecting said second communication session key at said second terminal based on said received indication of current time, whereby said second communication key is based said first and second variables which were exchanged between said first and second terminals in a message derived from the value of current time.

* * * * *